(12) United States Patent
Sudo et al.

(10) Patent No.: US 12,110,684 B2
(45) Date of Patent: Oct. 8, 2024

(54) CLIP, CEILING BASE, AND METHOD FOR CONSTRUCTING SAME

(71) Applicant: YOSHINO GYPSUM CO., LTD., Tokyo (JP)

(72) Inventors: Ushio Sudo, Tokyo (JP); Tomoya Hasegawa, Tokyo (JP); Takuji Yamashita, Tokyo (JP); Yusuke Watanabe, Tokyo (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 102 days.

(21) Appl. No.: 17/756,918

(22) PCT Filed: Nov. 18, 2020

(86) PCT No.: PCT/JP2020/043011
§ 371 (c)(1),
(2) Date: Jun. 6, 2022

(87) PCT Pub. No.: WO2021/131419
PCT Pub. Date: Jul. 1, 2021

(65) Prior Publication Data
US 2023/0012161 A1  Jan. 12, 2023

(30) Foreign Application Priority Data

Dec. 26, 2019 (JP) .................................. 2019-235925

(51) Int. Cl.
*E04B 9/18* (2006.01)
*E04B 1/98* (2006.01)
(Continued)

(52) U.S. Cl.
CPC ................ *E04B 9/183* (2013.01); *E04B 1/98* (2013.01); *E04B 9/065* (2013.01); *E04B 9/16* (2013.01);
(Continued)

(58) Field of Classification Search
None
See application file for complete search history.

(56) References Cited

U.S. PATENT DOCUMENTS

| 4,827,687 A * | 5/1989 | Frawley ................. E04B 9/245 52/473 |
| 10,060,460 B1 * | 8/2018 | Winn ..................... E04B 9/065 |

(Continued)

FOREIGN PATENT DOCUMENTS

| EP | 2551419 | 1/2013 |
| JP | 2010-013861 | 1/2010 |

(Continued)

OTHER PUBLICATIONS

Examination report dated Oct. 26, 2022 for Indian patent application No. 202217033985.

(Continued)

*Primary Examiner* — Joshua K Ihezie
(74) *Attorney, Agent, or Firm* — IPUSA, PLLC

(57) ABSTRACT

A clip that fixes a ceiling joist intersecting a ceiling joist receiver to the ceiling joist receiver, includes: a top portion having a width of the ceiling joist receiver; a first hanging portion hanging down from one end of the top portion, and provided with, at a lower portion, first engaging projections extending left and right to engage the ceiling joist; and a second hanging portion hanging down from another end of the top portion, and provided with, at a lower portion, second engaging projections extending left and right to lock the ceiling joist. The first hanging portion has a length longer than that of the second hanging portion, and a recess extending in a direction toward the second hanging portion is provided at an intermediate position of the first hanging portion.

12 Claims, 5 Drawing Sheets

(51) Int. Cl.
*E04B 9/06* (2006.01)
*E04B 9/16* (2006.01)
*E04B 9/22* (2006.01)
*E04G 21/14* (2006.01)
*E04H 9/02* (2006.01)

(52) U.S. Cl.
CPC ............... *E04B 9/22* (2013.01); *E04G 21/14* (2013.01); *E04H 9/021* (2013.01)

(56) References Cited

U.S. PATENT DOCUMENTS

| | | | | |
|---|---|---|---|---|
| 10,294,675 | B2 * | 5/2019 | Langeveld | E04F 13/083 |
| 11,608,636 | B1 * | 3/2023 | Underkofler | E04B 9/068 |
| 2018/0334803 | A1 * | 11/2018 | Underkofler | E04B 9/127 |
| 2019/0010969 | A1 * | 1/2019 | Winn | E04B 9/16 |
| 2019/0368525 | A1 * | 12/2019 | Winn | E04B 9/183 |

FOREIGN PATENT DOCUMENTS

| | | | |
|---|---|---|---|
| JP | 2014-202059 | | 10/2014 |
| JP | 2015-094068 | | 5/2015 |
| JP | 2016-089555 | | 5/2016 |
| KR | 10-0763871 | | 9/2007 |
| KR | 100763871 B1 | * | 10/2007 |
| KR | 20-2010-0007361 U | | 7/2010 |
| KR | 20100007361 U | * | 7/2010 |
| KR | 20180040222 A | * | 4/2018 |

OTHER PUBLICATIONS

Extended European search report dated Nov. 15, 2022 for European patent application No. 20904662.2.
International Search Report for PCT/JP2020/043011 mailed on Jan. 19, 2021.
Written Opinion of the International Searching Authority for PCT/JP2020/043011 mailed on Jan. 19, 2021.
Office Action mailed on Oct. 24, 2023 with respect to the corresponding Korean patent application No. 10-2022-7014072.

* cited by examiner

CLIP, CEILING BASE, AND METHOD FOR CONSTRUCTING SAME

TECHNICAL FIELD

The present disclosure relates to a clip, a ceiling base, and a method for constructing the same.

BACKGROUND ART

Conventionally, a ceiling base has been constructed by fixing intersections of ceiling joist receivers and ceiling joists with clips (fixing tools), for example, such that multiple ceiling joist receivers are suspended from the frame of a building or the like, and multiple ceiling joists are positioned below the ceiling joists receivers, to be orthogonal to the ceiling joist receivers. By fitting a ceiling surface material such as a gypsum board into the multiple ceiling joists forming the ceiling base, or by fixing the ceiling surface material with fixing means such as screws, a ceiling such as a suspended ceiling is formed.

A suspended ceiling characterized by the clips described above has been proposed. Specifically, multiple suspension channels are horizontally suspended; under these channels, single ceiling joists having a narrow width for intermediate use and double ceiling joists having twice the width of the single ceiling joists for expanding the main part are arranged alternately; and clips for common use are used to hook the both types of ceiling joists in a state of crossing to each other. The clip is a what-is-called single-support clip that has, at the upper portion, a folded portion to be fitted with a suspension channel, and portions to be bent forked at the tip of the folded portion; and at the lower portion, hooking legs that fit into and hook the hooked portions of the suspension channel. The suspended ceiling has the double ceiling joists whose opening for hooking clips have the width as narrow as the width of the opening for hooking clips of the single ceiling joists; has the opening for hooking clips formed close to a side plate on one side; and has a side plate on the other side of the double ceiling joist protruding out of the edge of the suspension channel so as to come into contact with a vertical wall surface (see, for example, Patent Document 1).

RELATED ART DOCUMENTS

Patent Documents

Patent Document 1
Japanese Laid-Open Patent Application No. 2010-13861

SUMMARY OF THE INVENTION

Problem to be Solved by the Invention

According to the suspended ceiling described in Patent Document 1, by making the opening for hooking clips of the double ceiling joist have the same width as that of the single ceiling joist, both the single ceiling joist and the double ceiling joist can be hooked under the suspension channel with the single type of clip, and the clip can be handled more easily to eliminate waste. However, there is a problem with the construction easiness because the portions to be bent of the clip need to be bent upon hooking the clip to the suspension channel. Also, as for what-is-called single-support clips represented by that described in Patent Document 1, there is a risk that the ceiling joists come off from the ceiling joist receivers, for example, due to shocks of the building upon an earthquake, and the ceiling joists and the ceiling surface material fall off.

The present disclosure provides a clip that has good construction easiness and can suppress or prevent the ceiling surface material from falling off when a building shakes; a ceiling base using this clip; and a method of construction the same.

Means for Solving Problem

A clip according to one aspect in the present disclosure is a clip that fixes a ceiling joist intersecting a ceiling joist receiver to the ceiling joist receiver, and includes
a top portion having a width of the ceiling joist receiver;
a first hanging portion hanging down from one end of the top portion, and provided with, at a lower portion, first engaging projections extending left and right to engage the ceiling joist; and
a second hanging portion hanging down from another end of the top portion, and provided with, at a lower portion, second engaging projections extending left and right to lock the ceiling joist,
wherein the first hanging portion has a length longer than that of the second hanging portion, and
wherein a recess extending in a direction toward the second hanging portion is provided at an intermediate position of the first hanging portion.

Also, a clip according to another aspect in the present disclosure is a clip that fixes a ceiling joist intersecting a ceiling joist receiver to the ceiling joist receiver, and includes
a top portion having a width of the ceiling joist receiver;
a first hanging portion hanging down from one end of the top portion, and provided with, at a lower portion, first engaging projections extending left and right to engage the ceiling joist; and
a second hanging portion hanging down from another end of the top portion, and provided with, at a lower portion, second engaging projections extending left and right to lock the ceiling joist,
wherein only the first engaging projections are provided with engaging recesses recessed downward at a root portion from which the first engaging projections extend.

Also, a clip according to another aspect in the present disclosure is a clip that fixes a ceiling joist intersecting a ceiling joist receiver to the ceiling joist receiver, and includes
a top portion having a width of the ceiling joist receiver;
a first hanging portion hanging down from one end of the top portion, and provided with, at a lower portion, first engaging projections extending left and right to engage the ceiling joist; and
a second hanging portion hanging down from another end of the top portion, and provided with, at a lower portion, second engaging projections extending left and right to lock the ceiling joist,
wherein the first hanging portion has a length longer than that of the second hanging portion,
wherein a recess extending in a direction toward the second hanging portion is provided at an intermediate position of the first hanging portion, and
wherein only the first engaging projections are provided with engaging recesses recessed downward at a root portion from which the first engaging projections extend.

Also, a ceiling base according to one aspect in the present disclosure includes a ceiling joist receiver formed of channel steel with lips, the channel steel having a web and two flanges each having a lip, the ceiling joist receiver being suspended from a frame of a building, in a state of having an opening face sideward;

a ceiling joist formed of channel steel with lips, the channel steel having a web and two flanges each having a lip, the ceiling joist coming into contact with the ceiling joist receiver while crossing the ceiling joist receiver, in a state of having an opening face upward; and a clip to fix the ceiling joist to the ceiling joist receive, wherein the clip includes a top portion having a width of the ceiling joist receiver, a first hanging portion hanging down from one end of the top portion, and provided with, at a lower portion, first engaging projections extending left and right to engage the ceiling joist, and a second hanging portion hanging down from another end of the top portion, and provided with, at a lower portion, second engaging projections extending left and right to lock the ceiling joist, wherein the first hanging portion has a length longer than that of the second hanging portion, wherein the clip is fitted into the ceiling joist receiver from above, so as to have the first hanging portion cover part of the opening of the ceiling joist receiver, and wherein the first engaging projections and the second engaging projections extending left and right are engaged or locked with the two flanges of the ceiling joist.

Further, a method of constructing a ceiling base according to one aspect in the present disclosure is a method of constructing the ceiling base that includes a ceiling joist receiver formed of channel steel with lips, the channel steel having a web and two flanges each having a lip, the ceiling joist receiver being suspended from a frame of a building, in a state of having an opening face sideward, a ceiling joist formed of channel steel with lips, the channel steel having a web and two flanges each having a lip, the ceiling joist coming into contact with the ceiling joist receiver while crossing the ceiling joist receiver, in a state of having an opening face upward, and a clip to fix the ceiling joist to the ceiling joist receiver, wherein the clip includes a top portion having a width of the ceiling joist receiver, a first hanging portion hanging down from one end of the top portion, and provided with, at a lower portion, first engaging projections extending left and right to engage the ceiling joist, and a second hanging portion hanging down from another end of the top portion, and provided with, at a lower portion, second engaging projections extending left and right to lock the ceiling joist, wherein the first hanging portion has a length longer than that of the second hanging portion, and wherein a recess extending in a direction toward the second hanging portion is provided at an intermediate position of the first hanging portion.

The method of constructing the ceiling base, includes fitting the clip with the ceiling joist receiver from above, so as to have the first hanging portion cover part of the opening of the ceiling joist receiver, and during a course of the fitting, when the recess provided in the first hanging portion is caught by a corner portion of an upper flange in the ceiling joist receiver, a lower end of the first hanging portion comes contact with the lip of a lower flange of the ceiling joist receiver, and fitting the ceiling joist into the clip from a bottom of the clip so as to have the first engaging projections and the second engaging projections extending left and right, engaged or locked with the two flanges of the ceiling joist each having the lip, so as to fix the ceiling joist to the ceiling joist receiver with the clip.

Advantageous Effects of the Invention

According to the present disclosure, a clip that has good construction easiness and can suppress or prevent the ceiling surface material from falling off when a building shakes; and a ceiling base using this clip, and a method of construction the same, can be provided.

BRIEF DESCRIPTION OF THE DRAWINGS

FIG. 4, is a process chart describing the example of the method of constructing the ceiling base according to the embodiment;

FIG. 5, is a process chart describing the example of the method of constructing the ceiling base according to the embodiment;

EMBODIMENTS FOR CARRYING OUT THE INVENTION

Figure 1:
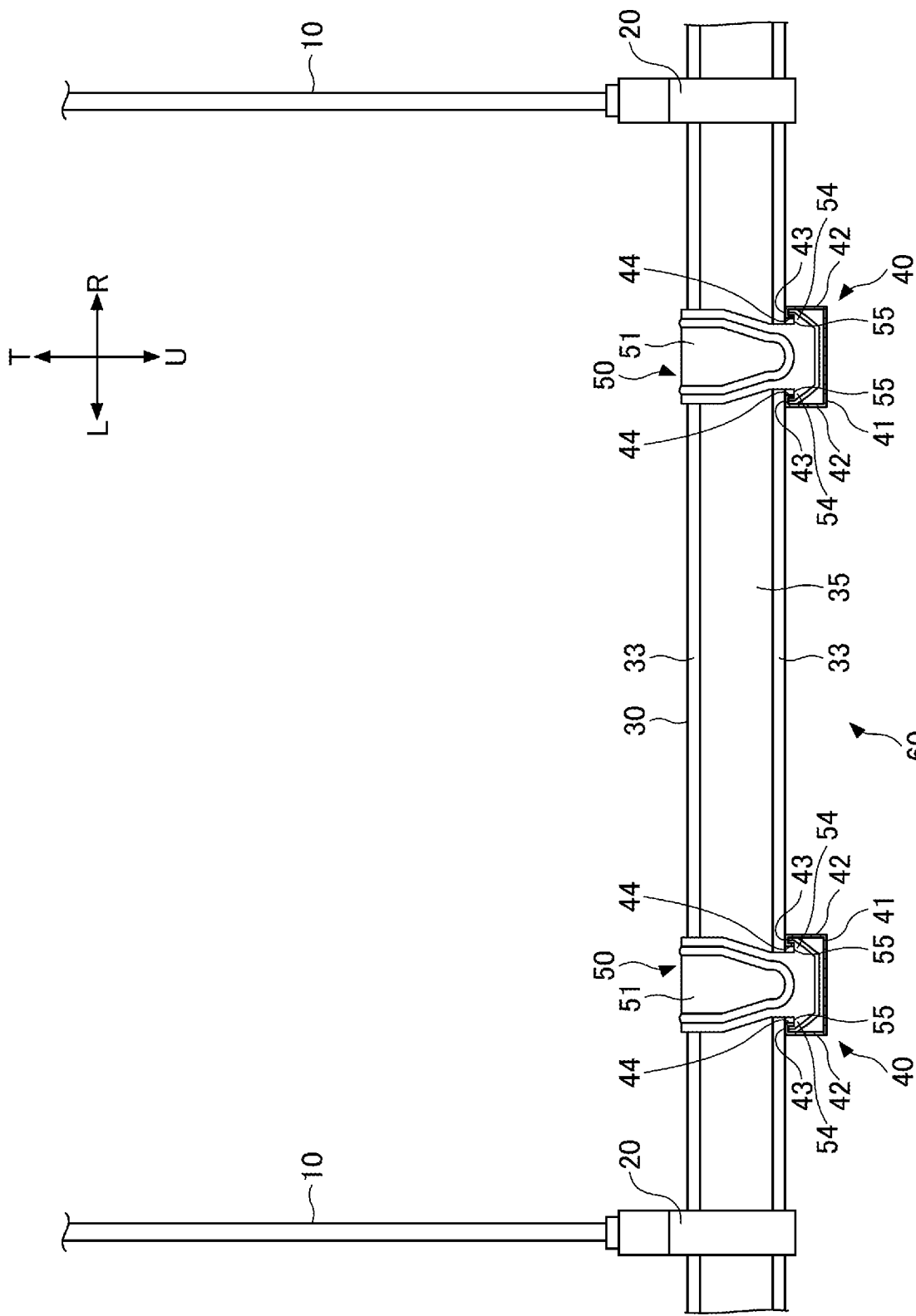
FIG. 1 is a front view illustrating an example of a ceiling base according to an embodiment.

In the following, an example of a clip, a ceiling base, and a method of constructing the same according to the embodiment will be described with reference to the drawings. Note that throughout the present description and drawings, the same reference numerals are assigned to substantially the same members, and their description may be omitted.

Ceiling Base and Clip According to the Embodiment

Figure 2:
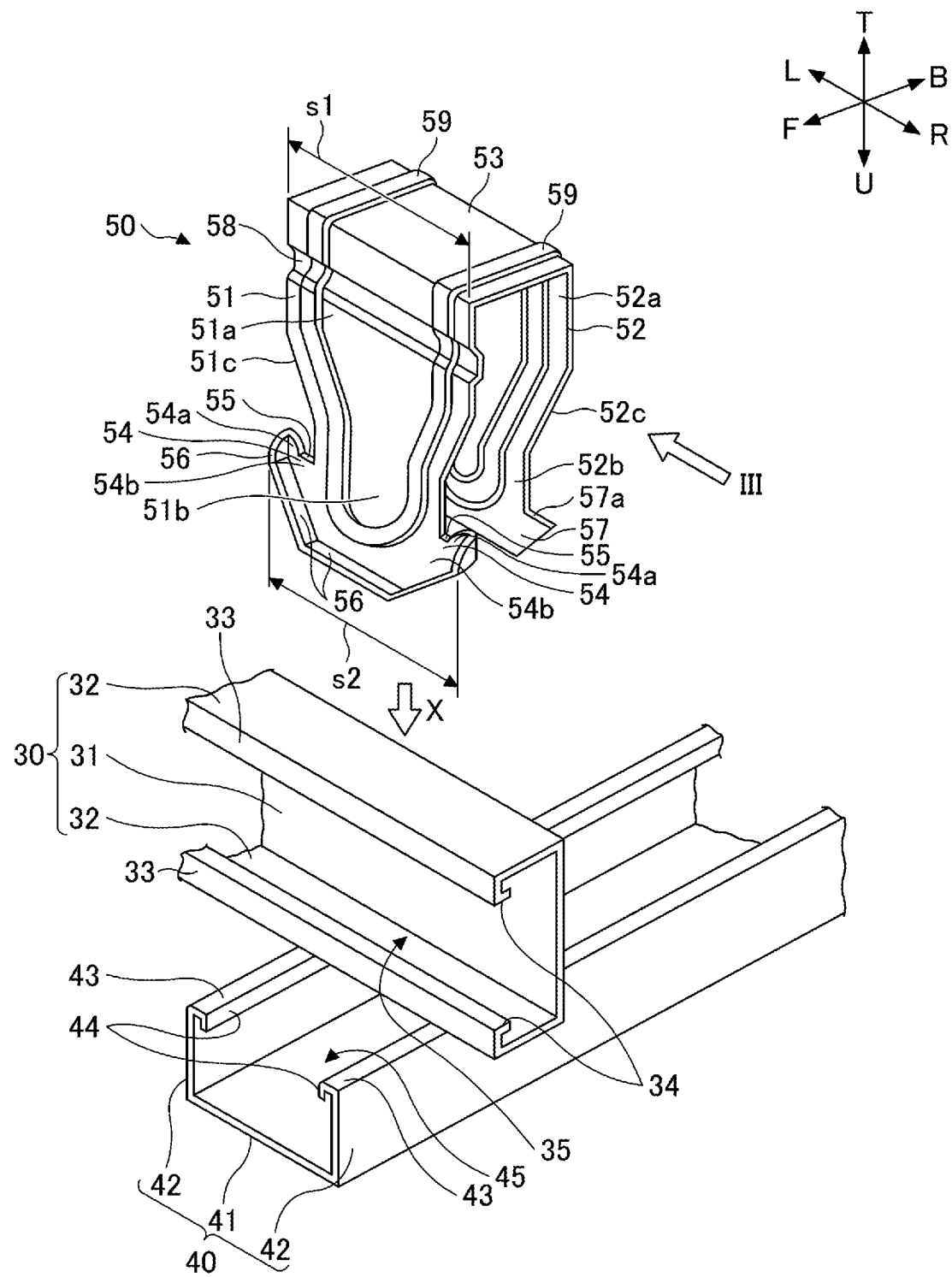
FIG. 2 is an exploded perspective view illustrating an example of a ceiling joist, a ceiling joist receiver, and a clip according to the embodiment, that constitute a ceiling base according to the embodiment.
Figure 3:
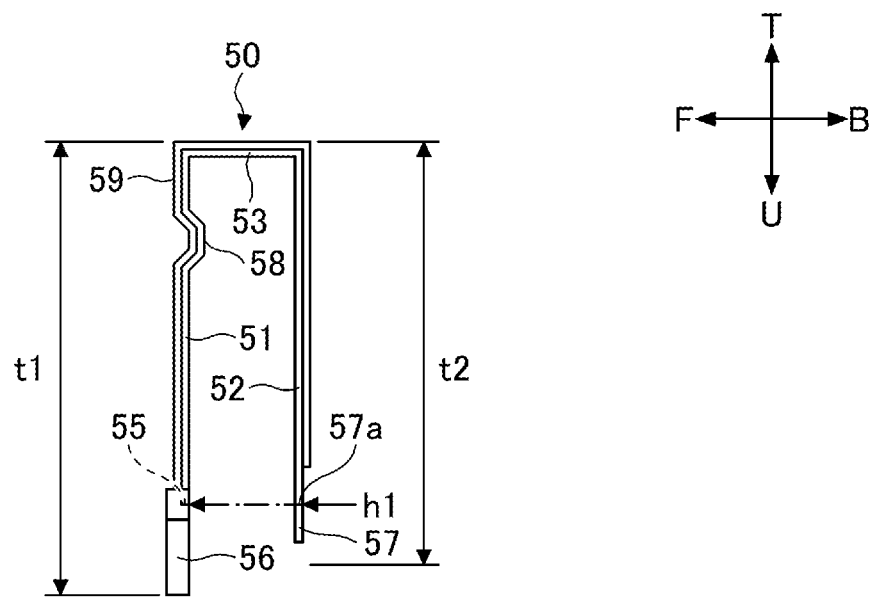
FIG. 3 is a view in the direction of arrow III in FIG. 2, and is a side view of the clip according to the embodiment.

First, an example of a ceiling base and clip according to the embodiment will be described with reference to FIGS. 1 to 3. Here, FIG. 1 is a front view illustrating an example of a ceiling base according to an embodiment; and FIG. 2 is an exploded perspective view illustrating an example of a ceiling joist, a ceiling joist receiver, and a clip according to the embodiment, that constitute a ceiling base according to the embodiment. Also, FIG. 3 is a view in the direction of arrow III in FIG. 2, and is a side view of the clip according to the embodiment.

Note that in FIG. 1 and the like, T direction, U direction, R direction, L direction, F direction, and B direction indicate the vertically upward direction, the vertically downward direction, the rightward direction, the leftward direction, the forward direction, and the backward direction, respectively. In addition, the rightward direction, the leftward direction, the forward direction, and the backward direction are directions defined for the sake of convenience of the description. In the present description, in a front view in which an opening 35 of a ceiling joist receiver 30 is visible, the rightward direction (R direction) and the leftward direction (L direction) are set as illustrated in FIG. 1. Also, in an extending direction of the ceiling joist 40 (longitudinal direction), a first hanging portion 51 side of a clip 50 is set as the forward direction (F direction), and a second hanging portion 52 side is set as the backward direction (B direction) as illustrated in FIG. 2.

A ceiling base 60 illustrated in FIG. 1 is a base that constitutes the ceiling of a building such as a suspended ceiling, and such suspended ceilings include system ceilings of detached houses, multiple dwelling houses such as and condominiums, and office buildings.

The ceiling base 60 has ceiling joist receivers 30 that are suspended from a frame such as beams (not illustrated) that forms the building, ceiling joists 40, and clips 50 that fixes the ceiling joist receivers 30 and the ceiling joists 40.

Hanging bolts 10 are hanging down from the frame of the building, and the ceiling joist receivers 30 are supported by hangers 20 that are fixed to the lower ends of the hanging bolts 10. By fitting a ceiling surface material such as a gypsum board into the multiple ceiling joists 40 forming the ceiling base 60, or by fixing the ceiling surface material with fixing means such as screws (not illustrated), the ceiling of the building is formed.

Multiple hanging bolts 10 are provided at intervals in the left-right direction and the front-back direction. Also, the hanger 20 is formed to have substantially a J-shape in side view, and the ceiling joist receiver 30 is housed in the interior of the substantially J-shape, and thereby, the ceiling joist receiver 30 is supported by the hangers 20. Note that the hanger 20 may formed to have a C-shape in side view, so as to have the opening side of the C-shape suspended by the hanging bolt 10, and to have the ceiling joist receiver 30 housed in the interior of the C-shape.

The ceiling joist receiver 30 is a member to support the ceiling joists 40 via the clips 50. The ceiling joist receiver 30 is an elongated member that has its longitudinal direction directed in the left-right direction. Also, the ceiling joist receiver 30 has a web 31 and two flanges 32 each having a lip 33, and is formed of, for example, channel steel having lips made of light gauge steel. At the tip of the lip 33, a folded portion 34 is formed by bending. Note that the web 31 may be provided with reinforcing ribs extending in the longitudinal direction, by press work or the like.

On the other hand, the ceiling joist 40 is an elongated member that has its longitudinal direction directed in the front-back direction. Also, the ceiling joist 40 has a web 41 and two flanges 42 each having a lip 43, and is formed of, for example, channel steel having lips made of light gauge steel. At the tip of the lip 43, a folded portion 44 is formed by bending. Note that the web 41 may be provided with reinforcing ribs extending in the longitudinal direction, by press work or the like.

Here, single-type channel steel having a lip may be applied to both the ceiling joist receiver 30 and the ceiling joist 40; or single-type (e.g., type 35 whose web has a width of 35 mm) channel steel having a lip (single ceiling joist) may be applied to the ceiling joist receiver 30, and single-type channel steel having a lip and double-type (e.g., type 45 whose web has a width of 45 mm) channel steel having a lip (double ceiling joist) may be applied to the ceiling joist 40 for different parts of the ceiling base 60. For example, the double ceiling joists can be applied to cuts in the ceiling surface material, and the single ceiling joists can be applied to elsewhere.

In the ceiling base 60, the ceiling joist receiver 30 in a state of having its opening 35 face sideward (F direction as the forward direction) is suspended from the frame of the building; the ceiling joist 40 in a state of having its opening 45 face upward (T direction) intersects the ceiling joist receiver 30; and the lower flange 32 of the ceiling joist receiver 30 comes into contact with the lips 43 of the ceiling joist 40. In general, the ceiling joists 40 intersect the ceiling joist receivers 30 in an aspect to be orthogonal to each other.

The clip 50 has a top portion 53 having the same width as the ceiling joist receiver 30; the first hanging portion 51 hanging down from one end of the top portion 53; and the second hanging portion 52 hanging down from the other end of the top portion 53. For example, the clip 50 is produced by applying folding and bending work to a single sheet of a steel plate made of light gauge steel.

As clearly illustrated in FIG. 3, the length t1 of the first hanging portion 51 is set to be longer than the length t2 of the second hanging portion 52. Note that an embodiment may be adopted in which both lengths are set to the same length.

As illustrated in FIG. 2, the first hanging portion has an upper portion 51a; a lower portion 51b having a narrower width than the upper portion 51a; and an intermediate portion 51c that connects the upper portion 51a and the lower portion 51b. The intermediate portion 51c has a trapezoidal shape in front view, and its left and right side edges are inclined inward as going downward.

At an intermediate position of the first hanging portion 51 (an intermediate position of the upper portion 51a in the illustrative example), a recess 58 extending in the direction toward the second hanging portion 52 is provided. This recess 58 is formed by applying press work to the first hanging portion 51 along a groove from F direction to B direction. Note that the recess may be, for example, a single recess or multiple recesses (hemispherical recess, cylindrical recess, square columnar recess, conical recess, pyramidal recess, or the like), and may have any shape that is caught by the corner portion of the upper flange 32 when fitting the clip 50 into the ceiling joist receiver 30 in a direction designated with X directed from the top to the bottom.

At the lower portion 51b of the first hanging portion, first engaging projections 54 are provided to extend in left and right so as to engage the ceiling joist 40. In addition, a width s1 of the upper portion 51a and a width s2 of the first engaging projections 54 extending left and right at the lower portion 51b are set to be the same or substantially the same.

The first engaging projection 54 has, at its root portion extending from the lower portion 51b, an engaging recess 55 recessed downward. In addition, the first engaging projection 54 has a projection 54a projecting upward on the outside of the engaging recess 55, and an inclined portion 54b inclined inward while going downward toward the lower end of the lower portion 51b. The projection 54a has its inside rounded, and this configuration allows the folded portion 44 to be smoothly guided to the engaging recess 55 along the rounded surface of the projection 54a, when having the folded portion 44 of the ceiling joist 40 engaged with the engaging recess 55. Also, the inclined portion 54b provides better fitting of the first engaging projection 54 to the ceiling joist 40. Note that although the inclined portion 54b of the illustrated example has one tapered edge, the inclined portion 54b may have two or more tapered edges having different angles.

In addition to the outer perimeter of the projection 54a and the inclined portion 54b of the first engaging projection 54, a continuous reinforcing rib 56 is provided at the outer perimeter of the flat lower end of the lower portion 51b. The reinforcing rib 56 is formed by applying outward folding and bending to the peripheral edges of the first engaging projections 54 and the lower portion 51b.

As illustrated in FIG. 1, by having the folded portion 44 of the ceiling joist 40 engaged with the engaging recess 55, the clip 50 is fixed to the ceiling joist 40; further, by providing the reinforcing rib 56, the rigidity of the lower portion 51b and the first engaging projections 54 is enhanced, and in addition, damage of the projection 54a that is outside the engaging recess 55 and has a narrow width is suppressed. Note that in the case of aiming at only reinforcement of the projection 54a outside of the engaging recess 55, the reinforcing rib may be provided only outside the projection 54a, or the reinforcing rib may be provided only outside the projection 54a and the inclined portion 54b.

Meanwhile, the second hanging portion 52 has an upper portion 52a; a lower portion 52b having a narrower width than the upper portion 52a; and an intermediate portion 52c that connects the upper portion 52a and the lower portion 52b. The intermediate portion 52c has a trapezoidal shape in front view, and left and right side edges inclined inward as going downward.

The lower portion 52b of the second hanging portion is provided with second engaging projections 57 extending left and right to locks to the ceiling joist 40. In addition, similar to the first hanging portion 51, a width of the upper portion 52a and a width of the second engaging projections 57 extending left and right at the lower portion 52b are set to be the same or substantially the same.

The side end of the second engaging projection 57 is inclined inward from the upper end to the bottom end, and this inclined end provides better fitting of the second engaging projection 57 to the ceiling joist 40. Note that although the side end of the second engaging projection 57 of the illustrated example is a single tapered side end, the side end may have two or more tapered side ends having different angles.

Also, all of the top portion 53, the first hanging portion 51, and the second hanging portion 52 are provided with a reinforcing projection 59. In the illustrated example, an endless reinforcing projection 59 is provided along the outline of the top portion 53, the first hanging portion 51, and the second hanging portion 52. The reinforcing projection 59 is formed by applying press work to the top portion 53, the first hanging portion 51, and the second hanging portion 52.

Further, as clearly illustrated in FIG. 3, although the first hanging portion 51 and the second hanging portion 52 are different in height, the level of the flat lower end of the engaging recess 55 and the level of the flat upper end 57a of the second engaging projection 57 are set to the same level hl. This allows the two folded portions 44 of the ceiling joist 40 to be engaged and locked with the engaging recesses 55 of the first hanging portion 51 and the second engaging projections 57 of the second hanging portion 52 at the same level, when the ceiling base 60 is formed.

As illustrated in FIG. 2, in a state of the ceiling joist 40 intersecting with the ceiling joist receiver 30 to come into contact with each other, when fitting the clip 50 into the ceiling joist receiver 30 in the X direction from the top to the bottom, while the clip 50 has the ceiling joist receiver 30 housed, the first engaging projection 54 engages the ceiling joist 40, and the second engaging projection 57 locks the ceiling joist 40. Further, at the multiple intersections of the ceiling joist receivers 30 and the ceiling joists 40, the ceiling joist receivers 30 and the ceiling joist 40 are fixed via the clips 50, and thereby, the ceiling base 60 illustrated in FIG. 1 is formed.

Note that although the second engaging projection may also be provided with an engaging recess to be fitted into the folded portion 44, if fitting the folded portion 44 into the engaging recesses provided in both the first engaging projection and the second engaging projection, attachment easiness of the clip to the ceiling joist 40 is reduced; therefore, it is favorable that only the first engaging projection 54 is provided with the engaging recess 55 as in the illustrated example.

Also, by making the first hanging portion 51 relatively longer than second hanging portion 52, the degree of fixation of the clip 50 to the ceiling joist 40 can be increased. Further, as will be described in detail later, during the course of attaching the ceiling joist 40 to the clip 50, the level of the projection 54a of the first hanging portion 51 deformed in F direction comes close to the level of the upper end of the second engaging projection 57 of the second hanging portion 52 that does not deform, and thereby, the ceiling joist 40 can be fitted into the clip 50 at substantially the same timing with respect to the first engaging projection 54 and the second engaging projection 57.

Further, both the first hanging portion 51 and the second hanging portion 52 have inclined intermediate portions 51c and 52c, respectively; therefore, the width of the upper portions 51a and 52a in the left-right direction can be set as long as possible. Therefore, the plane area of the top portion 53 having the same width as the width of the upper portion 51a and 52a in the left-right direction can be make as wide as possible. This allows the contact area between the top portion 53 and the upper flange 32 of the ceiling joist receiver 30 to be as wide as possible, and the degree of fixation of the ceiling joist receiver 30 and the ceiling joist 40 via the clip 50 can be further increased. Note that the first hanging portion and the second hanging portion may not be provided with intermediate portions, and may have a form having the same width in the left-right direction from the top to the bottom.

[Method of Constructing the Ceiling Base According to the Embodiment]

Figure 4:
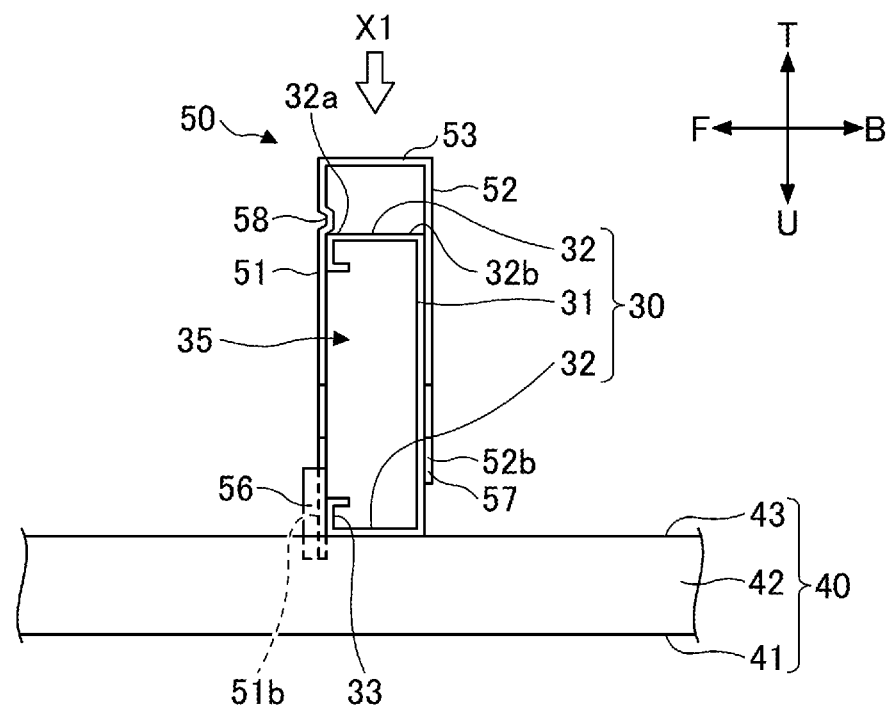
FIG. 4 is a process chart describing an example of a method of constructing a ceiling base according to the embodiment.
Figure 5:
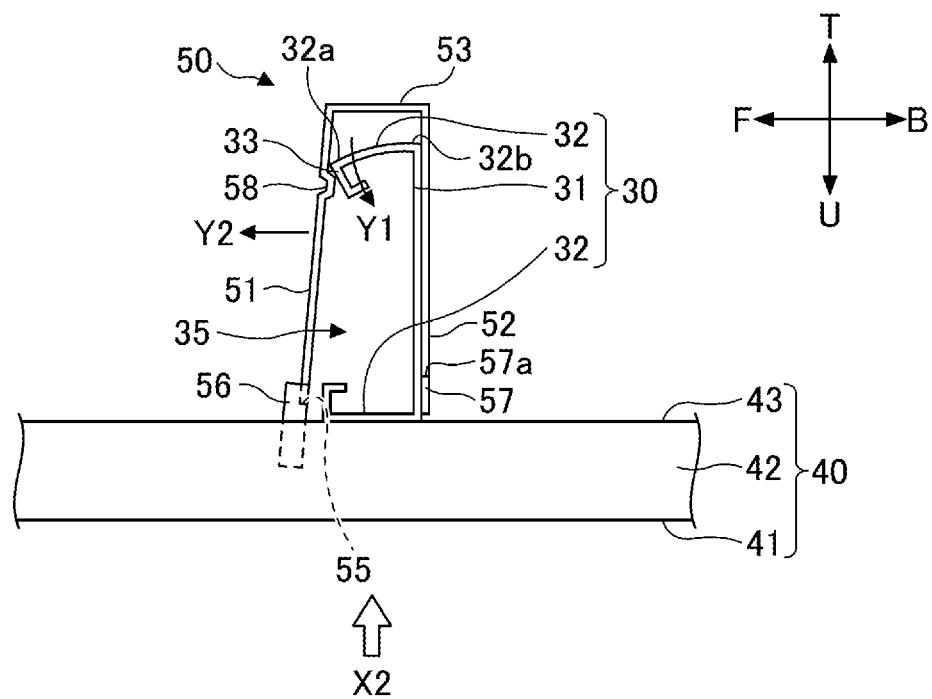
FIG. 5 following
Figure 6:
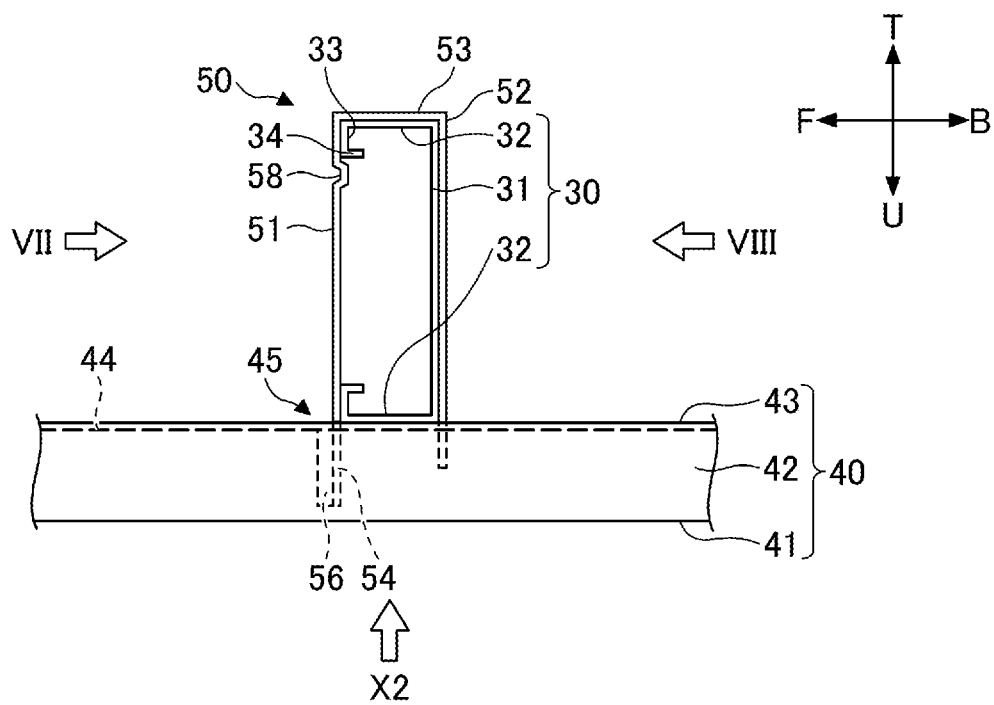
FIG. 6 following
Figure 7:
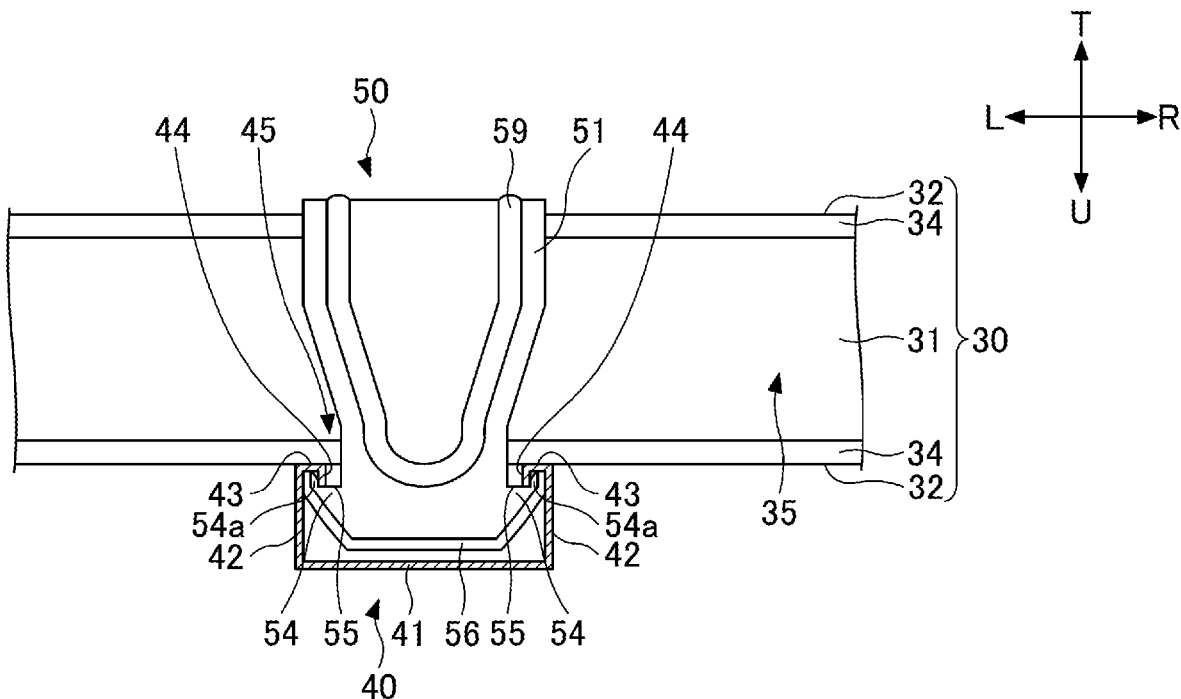
FIG. 7 is a view in the direction of arrow VII in FIG. 6, and is a front view as viewed from the first hanging portion side of the clip, in a state of the ceiling joist being fixed to the ceiling joist receiver via the clip.
Figure 8:
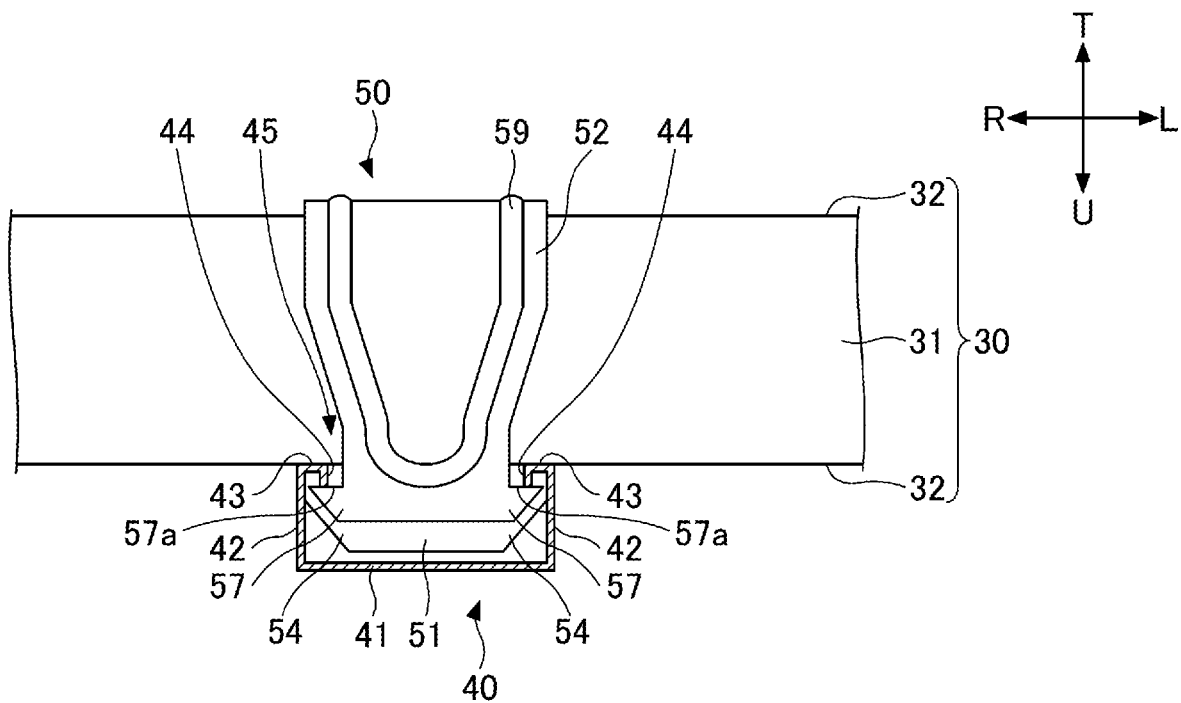
FIG. 8 is a view in the direction of arrow VIII in FIG. 6, and is a front view as viewed from the second hanging portion side of the clip, in a state of the ceiling joist being fixed to the ceiling joist receiver via the clip.

Next, an example of a method of constructing the ceiling base according to the embodiment will be described with reference to FIGS. 4 and 8. Here, FIGS. 4 to 6 are process charts sequentially describing an example of a method of constructing the ceiling base according to the embodiment. Also, FIG. 7 is a view in the direction of arrow VII in FIG. 6, and is a front view as viewed from the first hanging portion side of the clip, in a state of the ceiling joist being fixed to the ceiling joist receiver via the clip. Further, FIG. 8 is a view in the direction of arrow VIII in FIG. 6, and is a front view as viewed from the second hanging portion side of the clip, in a state of the ceiling joist being fixed to the ceiling joist receiver via the clip. Note that in FIGS. 4 to 6, illustration of the reinforcing projection 59 is omitted, to make the modified aspect of the clip 50 easier to understand.

As illustrated in FIG. 1, multiple hanging bolts 10 are hanging down from the frame of the building, and via the hangers 20 attached to the lower ends of the hanging bolts 10, multiple ceiling joist receivers 30 extending in the left-right direction are supported at intervals in the front-back direction.

The ceiling joists 40 are placed at the lower ends of the ceiling joist receivers 30 so as to extend across the multiple ceiling joist receivers 30 supported by the hangers 20.

Then, as illustrated in FIG. 4, in a direction designated with X1 from the top to the bottom of the ceiling joist receiver 30, the clip 50 is guided so as to have the first hanging portion 51 cover part of the opening 35 of the ceiling joist receiver 30, to fit the clip 50 around the ceiling joist receiver 30. By fitting the clip 50 in this way, the recess 58 provided in the first hanging portion 51 is caught in a corner portion 32a of the upper flange 32 in the ceiling joist receiver 30. In addition, when the recess 58 is caught in the corner portion 32a of the flange 32, the lower portion 51b of the first hanging portion 51 comes into contact with the lip 33 of the lower flange 32 of the ceiling joist receiver 30.

Note that if fitting the clip 50 into the ceiling joist receiver 30 so as to have as the second hanging portion 52 having a relatively short length cover part of the opening 35, namely, if fitting the clip 50 into the ceiling joist receiver 30 in a wrong orientation, the following problem may arise. That is, a situation may arise in which, during the course of this fitting, when the recess 58 provided in the first hanging portion 51 is caught by a corner portion 32b of the upper flange 32 in the ceiling joist receiver 30, the lower portion 52b of the second hanging portion 52 without coming into contact with the lip 33 of the lower flange 32 of the ceiling joist receiver 30, enters the inside of the ceiling joist receiver 30 via the opening 35, and thereby, the clip 50 cannot be fitted any further.

In contrast, as in the illustrated example, by fitting the clip 50 into the ceiling joist receiver 30 so as to have the first hanging portion 51 having a relatively long length cover part of the opening 35, namely, by fitting the clip 50 into the ceiling joist receiver 30 in the correct orientation, the entry of the lower end of the first hanging portion 51 into the interior of the ceiling joist receiver 30 via the opening 35 can be eliminated. Note that if making a mistake in the attaching direction of the clip 50, as described above, the second hanging portion 52 enters the inside of the ceiling joist receiver 30 via the opening 35; therefore, the worker may take the clip 50 back in the correct orientation as in the illustrated example, and then, fits the clip 50 into the ceiling joist receiver 30, and thereby, the ceiling joist receiver 30 can be attached with the clip 50.

In the state illustrated in FIG. 4, when the top portion 53 of the clip 50 is pressed with fingers, and the web 41 of the ceiling joist 40 is pushed upward in a direction designated with X2, while the recess 58 is pushing the upper flange 32 downward, the clip 50 is dropped downward. At this time, the presence of the opening 35 below the corner portion 32a of the upper flange 32 being pushed into the recess 58, makes the corner portion 32a of the upper flange 32 tend to deform downward in a direction designated with Y1. In this way, by having the upper flange 32 that tends to deform downward, the ceiling joist 40 can be pushed upward smoothly, and as a result, the clip 50 is dropped downward smoothly.

In addition, during the course of having the ceiling joist 40 pushed upward (the clip 50 is dropped downward), the first hanging portion 51 receives a pushing force from the lip 33 in F direction, and this pushing force causes deformation in a direction designated with Y2 directed in F direction. Also, at this time, the lower flange 32 of the ceiling joist receiver 30 is deflected upward by being pushed from the bottom by the lip 43 of the ceiling joist 40. In this way, the first hanging portion 51 deforms in F direction, and the lower flange 32 of the ceiling joist receiver 30 is deflected upward, and thereby, the height level of the upper end of the projections 54a of the first hanging portion 51 and the height level of the upper ends 57a of the second engaging projections 57 of the second hanging portion 52 come close to each other.

In the state illustrated in FIG. 5, when the ceiling joist 40 is pushed further upward in the X2 direction, the first engaging projections 54 of the first hanging portion 51 and the second engaging projections 57 of the second hanging portion 52 are inserted into the ceiling joist 40 via the opening 45, and the projections 54a of the first hanging portion 51 climbs over the left and right folded portions 44 of the ceiling joist 40, to fit inside the lip 43. At this time, for example, the height level of the upper ends of the projections 54a of the first hanging portion 51 and the height level of the upper ends 57a of the second engaging projections 57 of the second hanging portion 52 become substantially the same, and the first engaging projections 54 and the second engaging projections 57 are fitted into the ceiling joist 40 at substantially the same timing.

As illustrated in FIG. 7, in the first hanging portion 51, the left and right folded portions 44 of the ceiling joist 40 are fitted into the respective engaging recesses 55 of the first engaging projection 54, and thereby, the first engaging projections 54 are engaged with the ceiling joist 40.

On the other hand, as illustrated in FIG. 8, in the second hanging portion 52, the left and right upper ends 57a of the second engaging projections 57 are locked with the left and right folded portions 44 of the ceiling joist 40, and thereby, the second engaging projections 57 are locked with the ceiling joist 40.

In this way, with the ceiling joist 40, the first engaging projections 54 are engaged, and the second engaging projections 57 are locked, and thereby, the ceiling joist receiver 30 and the ceiling joist 40 are fixed via the clip 50. Thus, at the multiple intersections of the ceiling joist receivers 30 and the ceiling joists 40, the ceiling joist receivers 30 and the ceiling joist 40 are fixed by the clips 50, and thereby, the ceiling base 60 illustrated in FIG. 1 is constructed.

According to the illustrated method of constructing the ceiling base, the ceiling base 60 can be constructed with good construction easiness. In addition, the constructed ceiling base 60 has the ceiling joists 40 engaged or locked with the ceiling joist receivers 30 sandwiched by the first hanging portion 51 and the second hanging portion 52 of the clip 50 on both sides, and thereby, can prevent drop-off of the ceiling joist 40 and the ceiling surface material fixed thereto when the building shakes.

Note that other embodiments may be adopted in which other elements are combined with the elements exemplified in the embodiment described above, and the present disclosure is not limited to the configurations shown here. In this regard, it is possible to make changes within a scope not deviating from the gist of the present disclosure, which may be appropriately determined depending on the application form.

The present international application is based upon and claims the benefit of priority of Japanese Patent Application No. 2019-235925 filed on Dec. 26, 2019, the entire contents of which are hereby incorporated by reference.

LIST OF REFERENCE NUMERALS

10: hanging bolt
20: hanger

30: ceiling joist receiver (channel steel having a lip)
31: web
32: flange
33: lip
34: folded portion
35: opening
40: ceiling joist (channel steel having a lip)
41: web
42: flange
43: lip
44: folded portion
45: opening
50: clip
51: first hanging portion
51a: upper portion
51b: lower portion
51c: intermediate portion
52: second hanging portion
52a: upper portion
52b: lower portion
52c: intermediate portion
53: top portion
54: first engaging projection
54a: projection
54b: inclined portion
55: engaging recess
56: reinforcing rib
57: second engaging projection
57a: upper end
58: recess
59: reinforcing projection
60: ceiling base

The invention claimed is:

1. A clip that fixes a ceiling joist intersecting a ceiling joist receiver to the ceiling joist receiver, the clip comprising:
 a top portion having a width of the ceiling joist receiver;
 a first hanging portion hanging down from one end of the top portion, and provided with, at a lower portion, first engaging projections extending left and right to engage the ceiling joist; and
 a second hanging portion hanging down from another end of the top portion, and provided with, at a lower portion, second engaging projections extending left and right to lock the ceiling joist,
 wherein the first hanging portion has a length longer than that of the second hanging portion, and
 wherein a recess is provided only at an intermediate position of the first hanging portion, said recess extending in a direction toward the second hanging portion and the second hanging portion has no recess extending in the direction toward the first hanging portion.

2. A clip according to claim 1,
 wherein only the first engaging projections are provided with engaging recesses recessed downward at a root portion from which the first engaging projections extend.

3. The clip as claimed in claim 1, wherein the recess provided at the intermediate position of the first hanging portion is a recess having a groove shape.

4. The clip as claimed in claim 2, wherein a reinforcing rib is provided outside of the engaging recesses.

5. The clip as claimed in claim 1, wherein both the first hanging portion and the second hanging portions have a width at a lower portion narrower than a width at an upper portion, and are provided with the first engaging projections and the second engaging projections at the respective lower portions, wherein the width of the upper portion is the same or substantially the same as a width of the first engaging projections and a width of the second engaging projections, the first engaging projections and the second engaging projections extending left and right at the lower portions.

6. The clip as claimed in claim 1, wherein the first engaging projections extending left and right at the lower portion have edges inclined inward while going downward toward a lower end of the first hanging portion, and
 wherein the second engaging projections extending left and right at the lower portion have edges inclined inward while going downward toward a lower end of the second hanging portion.

7. The clip as claimed in claim 1, wherein each of the top portion, the first hanging portion, and the second hanging portion is provided with a reinforcing projection.

8. A ceiling base comprising:
 a ceiling joist receiver formed of channel steel with lips, the channel steel having a web and two flanges each having a lip, the ceiling joist receiver being suspended from a frame of a building, in a state of having an opening face sideward;
 a ceiling joist formed of channel steel with lips, the channel steel having a web and two flanges each having a lip, the ceiling joist coming into contact with the ceiling joist receiver while crossing the ceiling joist receiver, in a state of having an opening face upward; and
 a clip according to claim 1,
 wherein the clip is fitted into the ceiling joist receiver from above, so as to have the first hanging portion cover part of the opening of the ceiling joist receiver, and
 wherein the first engaging projections and the second engaging projections extending left and right are engaged or locked with the two flanges of the ceiling joist.

9. The ceiling base as claimed in claim 8, wherein only the first engaging projections of the clip are provided with engaging recesses recessed downward at a root portion from which the first engaging projections extend,
 wherein each of the lips has a folded portion at a tip, and
 wherein the first engaging projections are engaged with the respective flanges in a state of the folded portions being fitted into the engaging recesses.

10. The clip as claimed in claim 2, wherein the recess provided at the intermediate position of the first hanging portion is a recess having a groove shape.

11. The clip as claimed in claim 2, wherein both the first hanging portion and the second hanging portions have a width at a lower portion narrower than a width at an upper portion, and are provided with the first engaging projections and the second engaging projections at the respective lower portions, wherein the width of the upper portion is the same or substantially the same as a width of the first engaging projections and a width of the second engaging projections, the first engaging projections and the second engaging projections extending left and right at the lower portions.

12. The clip as claimed in claim 2, wherein the first engaging projections extending left and right at the lower portion have edges inclined inward while going downward toward a lower end of the first hanging portion, and
 wherein the second engaging projections extending left and right at the lower portion have edges inclined inward while going downward toward a lower end of the second hanging portion.

* * * * *